United States Patent
Phillips

(10) Patent No.: US 7,631,821 B2
(45) Date of Patent: Dec. 15, 2009

(54) IMPROVING GRINDING IN A ALUMINA EXTRACTION PROCESS

(75) Inventor: Everett C. Phillips, Corpus Christi, TX (US)

(73) Assignee: Nalco Company, Naperville, IL (US)

( * ) Notice: Subject to any disclaimer, the term of this patent is extended or adjusted under 35 U.S.C. 154(b) by 189 days.

(21) Appl. No.: 11/754,033

(22) Filed: May 25, 2007

(65) Prior Publication Data

US 2008/0289260 A1    Nov. 27, 2008

(51) Int. Cl.
*B02C 19/00*    (2006.01)
(52) U.S. Cl. ....................................................... 241/21
(58) Field of Classification Search ................... 241/21; 95/241
See application file for complete search history.

(56) References Cited

U.S. PATENT DOCUMENTS 5,601,726 A * 2/1997 Cole ........................... 210/727
5,837,211 A * 11/1998 Wang et al. .................. 423/121
6,485,651 B1 * 11/2002 Branning ..................... 210/702

* cited by examiner

*Primary Examiner*—Mark Rosenbaum
(74) *Attorney, Agent, or Firm*—Peter A. DiMattia; Michael B. Martin

(57) ABSTRACT

The present disclosure pertains to a method of improving the grinding of a bauxite containing slurry during the grinding stage of an alumina extraction process. Specifically, an effective amount of one or more non-ionic surfactants, polyglycols, polyglycol ethers, anionic surfactants, anionic polymers, or a combination thereof are added to said bauxite containing slurry during the grinding stage of an alumina extraction process to achieve an improved effect.

15 Claims, No Drawings

US 7,631,821 B2

IMPROVING GRINDING IN A ALUMINA EXTRACTION PROCESS

FIELD OF THE INVENTION

The present disclosure relates to a method of improving grinding in an alumina extraction process.

BACKGROUND

Alumina producers are constantly striving to make the process of extracting alumina from bauxite more economical; producers want to be able to make as much alumina as possible at the lowest operating cost. One aspect of an alumina extraction process that directly impacts process economics is the dynamics of the grinding stage.

The Bayer process is the most common process used to produce alumina ($Al_2O_3$) from bauxite ore. In a typical Bayer plant grind circuit, the bauxite ore(s) are combined with recycled caustic liquor, to generate slurry containing 25 to 55% solids.

The comminution process used depends on the bauxite type and physical characteristics (e.g. mineral composition, particle size, hardness and toughness). In general, the bauxite slurry is wet ground in a mill or a combination of mills including a rod mill, ball mill or a hammer mill. Rod mills may be used first to break large and tougher sized particles down to between 5 to 2 mm in diameter. Various screen types may be located at the discharge of the rod mill or a separate down stream Trommel screen, may be used for specific sizing control. The oversized particles are then recycled back to the inlet of the rod mill, while the under size material continues toward the digestion area.

Again depending on the nature of the bauxite(s) used in the plant, the slurry may be ground further to meet specific particle size targets. This is generally done to ensure effective down stream de-silication (if needed) but ultimately for effective alumina extraction in the digestion section of the plant. Thus, following the rod mills, a series of screens or cyclones may be used to separate the slurry grind for further recycling and grinding or to remove the finest particles so these may be transferred directly to the slurry relay tank. Comminution of the remaining slurry is then effected in a ball mill to give bauxite particle sizes below 0.5 to 0.1 mm. Ideally, the ratio of bauxite to spent liquor, which is added at the grinding stage, is driven solely by the alumina content in the bauxite and the desired liquor productivity. If higher than acceptable viscosity of the ground slurry occurs, then the capacity of the grinding circuit can be limited in order to affect adequate grinding of the bauxite.

Several operating factors affect the throughput of bauxite in the circuit. These include the type and size of mill used, the specific media charge and the downstream sizing control used. Poor grinding efficiency may be caused by excess bauxite flow for the size of the mill, very high slurry viscosity, larger than desired initial bauxite sizes and or insufficient media charge. This can result in a higher amount of recycle in the mill and an increase in energy consumption. In some cases, two mills might be used where the initial design called for only one mill.

Furthermore, in open milling circuits where sizing control is limited, poor grinding efficiencies will lead to challenges in maintaining adequate suspension of the oversized particles in down stream storage tanks. This can lead to higher mixing demands in the slurry relay and desilication sections of the circuit. The remedy in such circuits is often to cut the throughput of the bauxite in the circuit and this can lower plant alumina production.

Over grinding of the bauxite can also occur from a number of factors, namely, lower than design flow rates, low bauxite solid charges, high media charges, or as a result of excessive recycling within the mill circuit, for example, due to excessive scaling in either the mill discharge screens, or in down stream sizing control operations. Over grinding wastes energy and increases the particle surface area and the bulk viscosity of the bauxite slurry. This can directly affect the down stream pumpability of the slurry. Furthermore, inherent for some bauxites, high slurry viscosity increases the "stickiness" of the slurry, which can negatively affect scaling rates on screens, and in vessels and agitators in the pre-desilication section.

Improvements in the efficiency of grinding in an alumina extraction process are addressed in this disclosure.

SUMMARY OF THE INVENTION

The present disclosure provides for a method of improving the grinding of a bauxite containing slurry during the grinding stage of an alumina extraction comprising: adding an effective amount of one or more non-ionic surfactants, polyglycols, polyglycol ethers, anionic surfactants, anionic polymers, or a combination thereof to said bauxite containing slurry during the grinding stage of an alumina extraction process.

DETAILED DESCRIPTION OF THE INVENTION

There are many different types of process plants, e.g. Bayer process plants, which serve to extract alumina from bauxite. This disclosure serves to capture all types of process plant operations.

In one embodiment, the grinding occurs in at least one of the following mills: a ball mill, a rod mill, and a hammer mill.

Many different types of chemical species may be utilized to improve the grinding of bauxite containing slurry. In general, non-ionic surfactants, polyglycols, polyglycol ethers, anionic surfactants, and a combination thereof may be utilized to improve grinding efficiency. These chemicals may be added alone or in combination with one another.

Non-ionic surfactants may be utilized to improve the grinding of a bauxite containing slurry in an alumina extraction process. There are many different types of non-ionic surfactants known to those of ordinary skill in the art.

In one embodiment, the non-ionic surfactants are selected from the group consisting of: oxyalkylated alcohols; ethoxylated alcohols; propoxylated alcohols; polyether polyol; propoxylated glycerine/sucrose; ethylene oxide/propylene oxide block copolymer; ethoxylated alkylphenols; ethoxylated octylphenols; ethoxylated nonylphenols; ethoxylated nonylphenols/tall oil fatty acid; fatty alcohol ethoxylate; alkylphenol ethoxylate; fatty acid ethoxylate; fatty amide ethoxylate; fatty amine ethoxylate; alkyl glucoside; sorbitan alkanoate; ethoxylated sorbitan alkanoate; and a combination thereof.

Ethoxylated alcohols include Tergitol® 15-S-15, Tergitol® 15-S-12, and Tergitol® 15-S-9, which are all available from The Dow Chemical Company, Midland, Mich.

Polyether polyols include Voranol-446, which is available from The Dow Chemical Company. Voranol 446 contains propoxylated glycerine and sucrose.

Ethylene oxide/propylene oxide block co-polymers include PLURONIC® and PLURONIC® R, which are available from BASF Corporation.

Ethoxylated nonylphenols are available from Nalco Company, Naperville, Ill.

Polyglycols may be utilized to improve grinding of a bauxite containing slurry in an alumina extraction process. There are many different types of polyglycols known to those of ordinary skill in the art. Polyglycols include DOWFROTH® 250, which is available from The Dow Chemical Company. DOWFROTH 250 contains a mixture of polyglycols and polyglycol ethers.

In one embodiment, the polyglycols are polypropylene glycols. Polypropylene glycols are available from Nalco Company, Naperville, Ill.

In another embodiment, the polyglycols have a number average molecular weight of from about 200 daltons to about 1200 daltons.

In another embodiment, the polyglycols have a number average molecular weight of from about 400 daltons to about 800 daltons.

Anionic surfactants may be utilized to improve grinding of a bauxite containing slurry in an alumina extraction process. There are many different types of anionic surfactants known to those of ordinary skill in the art. Anionic surfactants are available from Nalco Company, Naperville, Ill.

In one embodiment, the anionic surfactants are selected from the group consisting of: alkyl sulfate; alkyl ethercarboxylate; alkylbenzene sulfonate; dialkyl sulfosuccinate; alkyl phosphate; alkyl etherphosphate; tall oil fatty acid/ethoxylated nonylphenol; dioctyl sulfosuccinate; and a combination thereof.

Anionic polymers may be utilized to improve grinding of a bauxite containing slurry in an alumina extraction process.

In one embodiment, the anionic polymers are terpolymers.

In another embodiment, the anionic polymers are terpolymers of acrylate, acrylamide, and acrylosulphonate.

In another embodiment, the anionic polymers are acrylic acid containing polymers.

In another embodiment, the anionic polymers are sulfonated.

In another embodiment, the anionic polymers are acrylic acid/methacrylate copolymers.

The various types of chemical species may be added to slurry via different routes. The chemical species may be mixed with the liquor (e.g. spent or evaporated strong) that is added to a mill, or with a bauxite containing slurry, which is added to the mill. Other modes and methods of addition would be apparent to one of ordinary skill in the art.

The bauxite containing slurry may have various physical and chemical properties.

In one embodiment, the bauxite containing slurry is an alkaline slurry.

In another embodiment, the bauxite containing slurry is at an elevated temperature of less than about 110° C.

In another embodiment, the bauxite containing slurry is at an elevated temperature from about 65° C. to about 100° C.

In another embodiment, the chemical species is in liquid form at ambient temperature and ambient pressure.

One of ordinary skill in the art could determine the amount of chemical species that should be added to the bauxite containing slurry so that there is an improvement in the grinding of the bauxite containing slurry. Such factors, as the chemical species, the slurry components, and viscosity of the slurry, are important in determining the amount of chemical species that should be added to the bauxite containing slurry. Concentrations expressed in this application are based upon the neat solution of chemical species or product combination if more than one species is applied.

Preferably, an effective amount of chemical species is about 10 ppm to about 1000 ppm. In one embodiment, the effective amount of chemical species is greater than about 10 ppm.

In another embodiment, the effective amount of chemical species is from about 150 ppm to about 500 ppm.

The following example is not meant to be limiting.

Example

In this work the grinding efficiency will be assessed by a Grind Index, herein defined as the ratio of the change in the particle size fraction versus the maximum achievable reduction for a specific size faction (e.g. −500 micron or −150 micron) as shown in the equation below:

$$\text{Grind Index}_{-500} = \frac{(P_{final} - P_{initial})}{(100 - P_{initial})}$$

$P_{initial}$ is initial portion of the sample that passes through a screen (e.g. −150 micron fraction/−500 micron fraction).

$P_{final}$ is the post-grind portion of the sample that passes through a screen (e.g. −150 micron fraction/−500 micron fraction).

The basic test method uses small 1 L lab scale grinding bottle. All the Bauxite used in this work was Jamaican and was pre-sized to a "coarse" fraction between −3.36 mm to +1.7 mm, using a ASTM-E11 #6 mesh screen (nominal pore size is 3350 micron) and ASTM-E11 #12 (nominal pore size is 1700 microns) mesh screen. Each 1 L mill consisted of a plastic bottle (internally baffled) and charged with 1.00 Kg of Zirconia grinding media (⅜"×⅜")—both are available from Coleparmer. Each test bottle was charged with the appropriate amount of moist bauxite and then a specific quantity of spent liquor (preheated to 90° C.) was added to give the desired bauxite slurry solids, e.g. 30, 35 or 40% solids. Then using a micro-liter syringed the required amount of the reagent was added to the bottle to give the desired dosage, e.g. about 150 ppm to about 900 ppm.

The bottle was sealed and then rolled on its side in an oven at 80° C. for a specific period of time, typically 30 or 40 min. at a constant speed of 14 revolutions per minute (rpm). Thus for each treated and untreated test, the grinding time and rate (rpm), temperature, caustic, percent solids and media charge were constant. At the completion of each test the slurry was transferred to a metal pot and the Static Yield Stress was measured using a YR-1 yield rheometer (available from Brookfield Engineering). Following this the slurry was wet sieved through a series of screens, e.g., a 500 μm mesh screen and then a 150 μm mesh screen. The screen retains were then dried in an oven and the mass was used to compute the Grinding Index for the 500 μm and 150 μm fractions. The results obtained for the two product chemistries A (DVS4M006, an ethoxylated alcohol, available from Nalco Company) and B (TX12772, a low molecular dispersant terpolymer of acrylate, acrylamide, and acrylosulphonate, available from Nalco Company) are given in Tables I and II respectively.

As expected the Grind Index ("G.I.") increases with milling time and decreases as solids increases. Thus at a constant media charge the duration of milling and the amount of solids to be ground influence the grinding efficiency. However, with the addition of between about 150 ppm to about 900 ppm of the grinding aid, the grind index consistently improves by approximately 0.01 to about 0.025 while the viscosity of the slurry is reduced, as noted by a significant decrease in the static yield stress for the treated slurry versus that of the untreated slurry.

TABLE I

Lab Milling Test Results with Sample A
(an alcohol ethoxylate surfactant).

| % Solids | Milling Time, min | Dose, ppm | G. I. (500 μm) | G. I. (150 μm) | Yield Stress, Pa |
|---|---|---|---|---|---|
| 35 | 25 | 0 | 0.900 | 0.757 | n.d. |
|  |  | 237 | 0.924 | 0.789 | n.d. |
| 35 | 30 | 0 | 0.920 | 0.800 | 3.6 |
|  |  | 243 | 0.949 | 0.815 | 2.0 |
| 35 | 40 | 0 | 0.930 | 0.870 | 11.1 |
|  |  | 436 | 0.940 | 0.890 | 6.8 |
| 40 | 30 | 0 | 0.870 | 0.700 | 8.0 |
|  |  | 156 | 0.880 | 0.715 | 4.1 |

All tests involved a milling temperature of 80° C. at a rate of 14 rpm.
n.d. = not determined;
Pa = pascals

TABLE II

Lab Milling Test Results with Sample B
(an anionic terpolymer dispersant).

| % Solids | Milling Time, min | Dose, ppm | G. I. (500 μm) | G. I. (150 μm) | Yield Stress, Pa |
|---|---|---|---|---|---|
| 30 | 45 | 0 | 0.918 | 0.944 | n.d. |
|  |  | 232 | 0.937 | 0.955 | n.d. |
| 35 | 40 | 0 | 0.931 | 0.878 | 11.1 |
|  |  | 871 | 0.946 | 0.889 | 1.0 |
| 40 | 35 | 0 | 0.943 | 0.751 | 12.1 |
|  |  | 405 | 0.960 | 0.770 | 9.3 |

All tests involved a milling temperature of 80° C. at a rate of 14 rpm.
n.d. = not determined;
Pa = pascals

I claim:

1. A method of improving the grinding of a bauxite containing slurry during the grinding stage of an alumina extraction process comprising:
   a. adding an effective amount of one or more non-ionic surfactants, polyglycols, polyglycol ethers, anionic surfactants, anionic polymers, or a combination thereof to said bauxite containing slurry during the grinding stage of an alumina extraction process.

2. The method of claim 1, wherein said alumina extraction process is a Bayer process.

3. The method of claim 1 wherein said non-ionic surfactants are selected from the group consisting of: oxyalkylated alcohols; ethoxylated alcohols; propoxylated alcohols; polyether polyol; propoxylated glycerine/sucrose; ethylene oxide/propylene oxide block copolymer; ethoxylated alkylphenols; ethoxylated octylphenols; ethoxylated nonylphenols; ethoxylated nonylphenols/tall oil fatty acid; fatty alcohol ethoxylate; alkylphenol ethoxylate; fatty acid ethoxylate; fatty amide ethoxylate; fatty amine ethoxylate; alkyl glucoside; sorbitan alkanoate; ethoxylated sorbitan alkanoate; and a combination thereof.

4. The method of claim 1 wherein said polyglycols are polypropylene glycols.

5. The method of claim 1 wherein said polyglycols have a number average molecular weight of from about 200 daltons to about 1200 daltons.

6. The method of claim 1 wherein said polyglycols have a number average molecular weight of from about 400 daltons to about 800 daltons.

7. The method of claim 1 wherein said anionic surfactants are selected from the group consisting of: alkyl sulfate; alkyl ethercarboxylate; alkylbenzene sulfonate; diallyl sulfosuccinate; alkyl phosphate; alkyl etherphosphate; tall oil fatty acid/ethoxylated nonylphenol; dioctyl sulfosuccinate; and a combination thereof.

8. The method of claim 1 wherein said effective amount is greater than about 10 ppm.

9. The method of claim 1 wherein said effective amount is from about 10 ppm to about 1000 ppm.

10. The method of claim 1 wherein said effective amount is from about 150 ppm to about 500 ppm.

11. The method of claim 1, wherein said anionic polymers are terpolymers of acrylate, acrylamide, and acrylosulphonate.

12. The method of claim 1 wherein said anionic polymers are acrylic acid containing polymers.

13. The method of claim 1 wherein said anionic polymers are sulfonated.

14. The method of claim 1 wherein said anionic polymers are acrylic acid/methacrylate copolymers.

15. The method of claim 1 wherein said anionic polymers are terpolymers.

* * * * *